Dec. 12, 1950          D. R. DE BOISBLANC                 2,534,004
                  DETONATION VOLTAGE MEASURING MEANS

Filed Aug. 20, 1945                                4 Sheets-Sheet 3

INVENTOR.
D. R. DE BOISBLANC
BY Hudson & Young
ATTORNEYS

INVENTOR
D. R. DE BOISBLANC
BY Hudson & Young
ATTORNEYS

Patented Dec. 12, 1950

2,534,004

UNITED STATES PATENT OFFICE 2,534,004

DETONATION VOLTAGE MEASURING MEANS

Deslonde R. de Boisblanc, Bartlesville, Okla., assignor to Phillips Petroleum Company, a corporation of Delaware Application August 20, 1945, Serial No. 611,643

15 Claims. (Cl. 73—35)

This invention relates to methods of and means for measuring the average amplitude of a sequence of voltage pulses. In a more specific aspect it relates to methods of and means for measuring the average amplitude of a sequence of voltage pulses with respect to the peak amplitudes of such pulses and independently of the time interval between said pulses. In a still more specific aspect it relates to methods of and means for indicating the intensity of detonation, or knocking, in an internal combustion engine by electronic methods and means designed to be in substantial agreement with the results obtained by the human ear, but to determine the intensity level with a higher degree of accuracy, all independent of the time intervals between the detonating cycles of the engine.

Knocking, which is detonation, is destructive to internal combustion engines, especially to aircraft engines which are lightly built and which are operated close to the knocking level in order to obtain the maximum power possible. A locking level, or level of detonation, as judged by the human ear, depends entirely upon the amplitude of the detonation pulses and not on their spacing time.

I have found that because of human psychology, the human ear is more accurate in determining the average knocking intensity independent of time intervals than detonation meters of the prior art, because the human ear and mind tends to ignore or fail to consider such time intervals. Therefore the human ear is a better judge of the standard level of detonation intensity at which fuels are rated in the laboratory than detonation meters which give a simple time average of individual detonation pulses when the time interval between knocking power strokes tends to fluctuate. It has been found, however, that the human ear is not a satisfactory detonation meter because the values found vary from person to person, only certain persons are capable of making accurate judgement, and highly skilled and trained persons are expensive to employ and are still not as reliable as an electronic instrument. An electronic instrument can easily measure differences in detonation level accurately which differences are entirely too small for the human ear to detect.

The present invention may be regarded as being related to my application Serial No. 548,757, filed August 9, 1944, now Patent No. 2,448,323 for Detonation Meter. The meter of said application is much better than the human ear, even when there is considerable variation in the time interval between knocking. The present invention, however, will give just as high accuracy at any point over a time interval range of from about 10 knocks per second to 1 knock every 20 seconds, which covers all possible knocking in present type test engines. This accuracy also extends in a usable degree from a knock every power stroke to one every minute in an 1800 R. P. M. 4-cycle internal combustion engine, and by obvious changes in constants of resistance and capacity a worker skilled in the art can greatly increase this range without invention by using the circuits as disclosed and claimed hereinafter. The first mentioned range is believed ample for present uses, however, as it covers all observed time variations in knocking.

The principal object of the present invention is to provide methods of and means for measuring the average amplitude of a sequence of voltage pulses.

Another object is to provide methods of and means for measuring such average amplitudes independent of the time interval between said pulses and with respect to the peak amplitudes thereof.

A further object is to provide methods and means for measuring detonation in an internal combustion engine.

A still further object is to provide methods and means for averaging a sequence of detonation generated voltage pulses with respect to the peak amplitude of said pulses and independently of the average time interval of said pulses.

Numerous other objects and advantages will be apparent to those skilled in the art upon studying the accompanying specification, claims and drawings.

Figure 1:
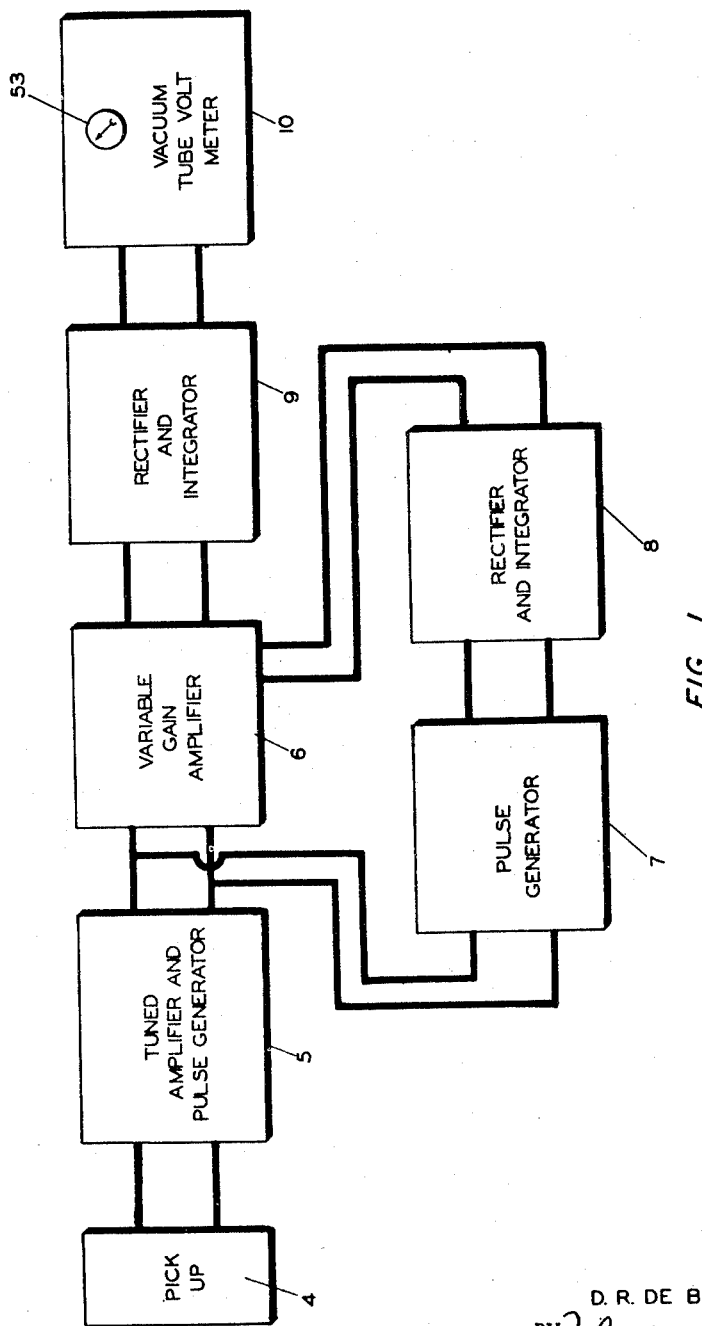
Figure 1 is a block diagram of an arrangement of electrical units embodying the present invention.

As is well understood, knocking in an internal combustion engine results when an explosive mixture detonates and rapid pressure changes occur in the cylinder in the form of pressure or sound waves. It has been demonstrated that the knock intensity is substantially proportional to the rate of change of pressure in the cylinder head of said internal combustion engine (not shown).

The pressure variations in the cylinder head may be converted into electrical voltages by means of a pickup device sensitive thereto, a number of which are available, all suitable for this purpose, and which device is represented in the drawings as pickup 4. While many types of these pickups are suitable for use with the present invention, I prefer a magneto-striction pickup of the Standard Oil Company of California because it can be screwed into a hole in the cylinder head, like a spark plug, and because the voltage output is substantially proportional to the rate of change of pressure in the cylinder over a suitable range. I can use other internal or external type pickups which are known.

Circuit of Figure 1

In Figure 1, pickup 4 generates voltages proportional to the rate of change of pressure in said cylinder head and therefore proportional to the knock intensity. Any other source of similar voltages may be employed. When this voltage is from an internal combustion engine, there are present in the voltage relatively high amplitude, relatively high frequency, knock components and relatively low amplitude, high frequency, valve clatter components; as well as a relatively high amplitude, low frequency, power stroke pressure rise component (components are not shown). In tuned amplifier and pulse generator 5 the low frequency component is filtered out, and the low amplitude components are cut out by a threshold, and an exponential pulse is generated (not shown) the amplitude of which is proportional to the voltage generated by said knock components. This exponential pulse (not shown) is substantially the same as pulse 20 of Figure 1 of said prior application and has been similarly produced, as will be evident when the description of Figure 2 is reached.

The exponential pulses produced by 5 are transmitted in two channels, directly to variable gain amplifier 6, and to pulse generator 7. Pulse generator 7 generates a uniform pulse (not shown) for each of said exponential pulses regardless of the variations in amplitude of said exponential pulses. These uniform pulses are rectified and "counted" as to number per unit of time by the process of being accumulated in a condenser in the rectifier and integrator 8 which generates a suitable voltage to be used in varying the gain of the variable gain amplifier 6 in inverse proportion to the frequency of said exponential knocking pulses.

Variable gain amplifier 6 amplifies the exponential pulses from 5 an amount inversely proportional to their frequency as controlled by a gain control actuated by 8. The resulting voltage from 6 is rectified and integrated in rectifier and integrator 9 and the resulting voltages applied to a suitable indicating device 10. As such an indicating device I have shown a vacuum tube volt meter as preferable in the circuits to be explained in Figure 2, but of course other indicating means may be employed without departing from the invention, as will be illustrated by the indicating device 82 shown in Figure 3 and described below.

Figure 2:
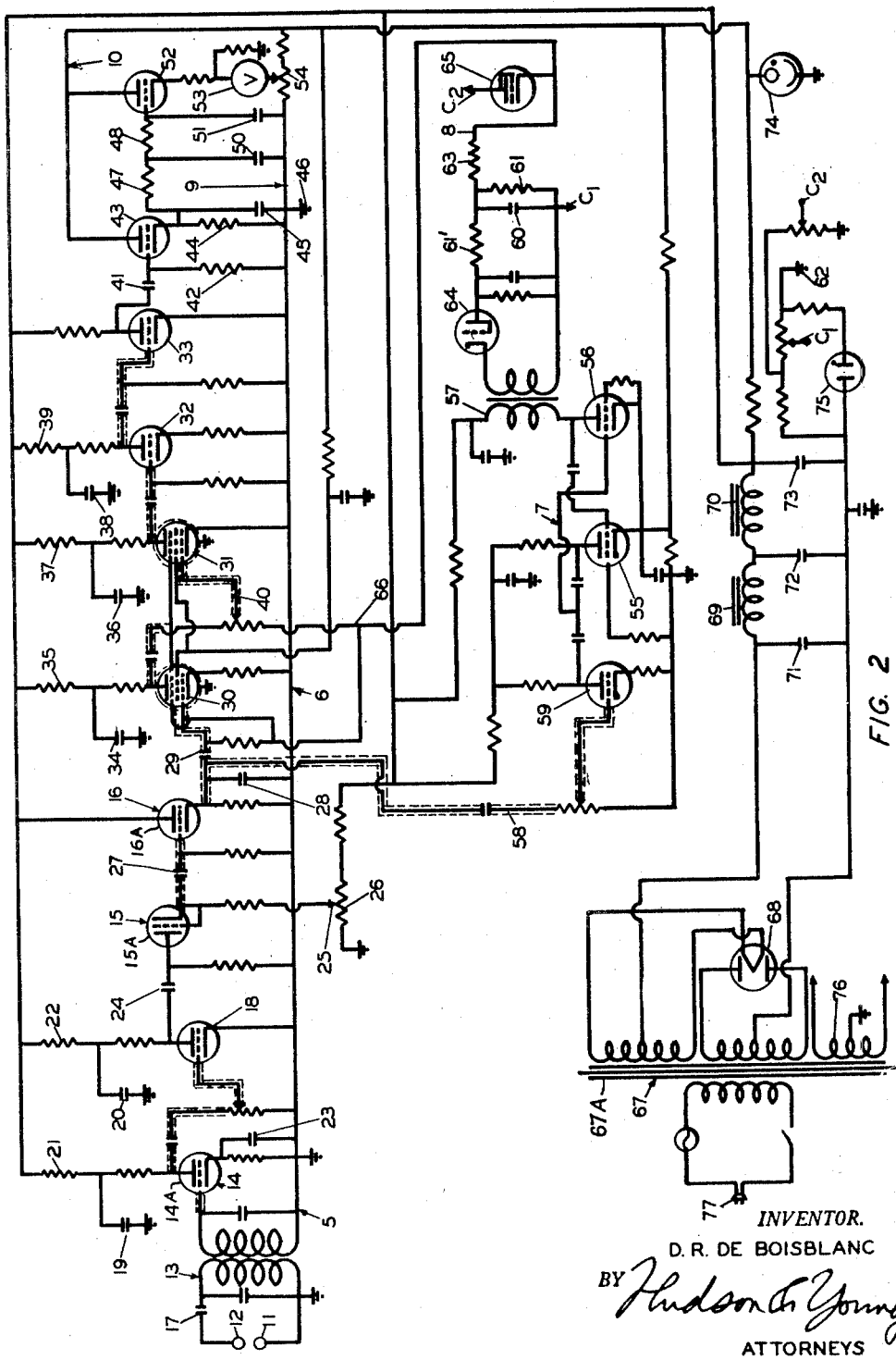
Figure 2 is a wiring diagram of a suitable electrical network which may be employed in setting up the apparatus shown in Figure 1.

Operation of Figures 1 and 2

A simple mathematical explanation of the operation of Figure 1 is now given. Obviously as Figure 2 is merely a suitable wiring diagram for use in Figure 1 the operation of Figure 2 is the same as that of Figure 1.

A = average height of pulses from 5
D = meter deflection of 10
E = voltage output of 8
F = average number of said exponential pulses per suitable time interval, for example per minute
H = average height of pulses from 6
M = gain of amplifier 6
$K_1$, $K_2$, etc. = various instrumental constants $$D = K_1 H F$$

$M = \dfrac{K_2}{E}$ (over the normal operating range of the instrument)

$$E = K_3 F$$

$$M = \frac{K_2}{K_3 F} = \frac{K_4}{F}$$

$$H = MA = \frac{K_4 A}{F}$$

$$D = K_1 \left(\frac{K_4 A}{F}\right) F = K_1 K_4 A$$

$$K_1 \cdot K_4 = K_5$$

$$D = K_5 A$$

Therefore the deflection D of meter 10 is proportional to the average amplitude of a sequence of voltage pulses with respect to the peak amplitudes of said pulses and is independent of the time interval between said pulses; and thus all the objects of the invention are thereby achieved.

While various circuits may be devised to implement the blocks 4 to 10 of Figure 1 so that it will operate as above described, I preferably employ a circuit having the general characteristics of that shown in Figure 2.

Circuit of Figure 2

Figure 2 contains elements that correspond in function to the blocks 4 to 10 of Figure 1, and they will be pointed out. However, it should be realized that in electronic circuits sometimes parts have several functions and often the same physical element of Figure 2 may be shared by two or more of the block elements of Figure 1, the same relation holding for Figures 4 and 3. Also coupling elements may be considered as a part of either block or neither.

Pickup 4

In Figure 2 terminals 11 and 12 may be connected to the suitable pickup 4 (not shown in Figure 2) as described above.

Tuned amplifier and pulse generator 5

Unit 5 comprises a band pass or high frequency pass filter generally designated as 13, a standard type voltage amplifier generally designated as 14, a threshold circuit generally designated as 15 and a pulse generator generally designated as 16, all connected by various standard coupling and decoupling units.

While other filters may be used, filter 13 preferably is a critically coupled band pass filter resonant at about 6500 cycles per second. As such it comprises two inductively coupled windings each in parallel with a suitable condenser. Condenser 17 is a means of stopping any direct currents, and acts as a coupling from the pickup 4 to filter 13.

The standard voltage amplifier 14 may be of any known type and is shown as triodes 14A and 18 and related resistances and condensers. Condensers 19 and 20 with resistances 21 and 22 respectively act as decoupling filters. Condenser 23 is a gain increasing condenser which by-passes alternating current to prevent negative feed back. Condenser 24 couples the amplifier to the threshold circuit 15.

The threshold circuit comprises diode 15A and related resistances, the amplitude of the threshold being set by adjustable tap 25 on resistance 26. Condenser 27 couples the threshold circuit to the pulse generator 16. It will be noted that diode 15A and others such as diodes 64 and 65 are made from triodes by tying the grid to the cathode, but regular diodes may be used instead if desired, the reason for using triodes being to reduce the number of kinds of tubes by using the same triodes throughout.

Pulse generator 16 comprises a triode 16A, the resistances connected to its grid and cathode and condenser 28. The pulse generator is coupled to the variable gain amplifier 6 by condenser 29.

Variable gain amplifier 6

Any suitable variable gain amplifier may be used for unit 6, and in the drawing one such preferred circuit is shown, pentodes 30 and 31 and related parts being the variable gain portion and triodes 32 and 33 and related parts providing further ordinary amplification. Tubes 30, 31 and 32 are provided with decoupling filters 34, 35; 36, 37; and 38, 39 respectively. The amplifier gain is controlled by movable tap 40. The variable gain amplifier is coupled by condenser 41 and resistance 42 to the rectifier and integrator 9.

Rectifier and integrator 9

Unit 9 comprises three parts, a triode 43 which has almost no resistance in its plate circuit and therefore acts as a power rectifier, an integrating circuit of resistance 44 and condenser 45 in parallel and running to ground 46 and a time constant circuit comprising large resistances 47, 48 (which may be in the vicinity of 20 megohms each) and condensers 50 and 51 selected to give the desired time constant with resistances 47 and 48, by the well understood resistance capacitance relationships. From the right side of resistance 48 the signal is conducted onto the grid of triode 52 of the bolt meter circuit 10.

Vacuum tube volt meter 10

While other indicating means may be employed in the circuit of Figure 2, I prefer to use the usual type vacuum tube voltmeter, an example of which is shown as triode 52 and related cathode connected resistances and voltmeter instrument 53 which is provided with a zero adjustment 54, an indicating needle and a dial (shown symbolically in Fig. 1).

Pulse generator 7

The pulse generator 7 may be any known type but preferably comprises a multivibrator composed of triodes 55 and 56 with their grids and plates cross coupled, which multivibrator produces a uniform amplitude (and uniform amplitude-time area) pulse (not shown) in transformer coupling 57 for each variable pulse received from pulse generator 16 over channel 58.

The multivibrator is prevented from sending pulses back channel 58 by a buffer circuit comprising triode 59 and related parts.

The uniform pulses from multivibrator 55, 56 go through transformer 57 and accumulate on condenser 60 of suitable capacity through a relatively high resistance 61'. For example if resistance 47 and 48 are 20 megohms each, then 61' could be in the vicinity of 10 megohms. $C_1$ is a voltage level more negative than ground 62, for example a small amount, say about $-19$ or $-20$ volts. The relation of accumulation on 60 and flow off through 61 results in the charge on 60 being proportional to the average number of pulses per time unit. Resistance 61 is chosen to make the leakage resistance across the condenser 60 a definite and substantially invariable quantity, for example about 10 megohms. Resistance 63 leads to channel 66 to be described later.

Rectifier and integrator 8

The rectifier is diode 64. The integrator comprises all the resistances and condensers between diodes 64 and 65 in Figure 2. Diode 65 is a compensating diode to control the bias limiting factors of the circuit. Diode 64 forms a direct current voltage which is integrated, averaged with the time constant, and coupled by channel 66 to both the suppressor grids and control grids of super-control pentodes 30 and 31 thus giving a more delicate control than a simple grid bias control which could also be used, especially as 30 and 31 are in cascade. Other types of rectifiers and integrators may be used and other means of coupling to the variable gain amplifier 6 may be employed without departing from the invention.

Power pack 67

While power may be provided by batteries or in any other conventional way, I prefer to employ a radio type power pack generally designated 67 (which may be plugged into the usual alternating house current source) having an iron core transformer 67A with the usual center tapped coils and two plate diode 68 which creates a pulsating direct current. The pulsations are filtered out by iron core inductances 69, 70 and condensers 71, 72, 73. A voltage regulator 74 and a neon bulb 75 act to further stabilize the power supply. Coil 76 supplies current to all cathode heaters or filaments (not shown) for every cathode shown in Figure 2. The pack is plugged in at 77 to any house current system (not shown).

Figure 3:
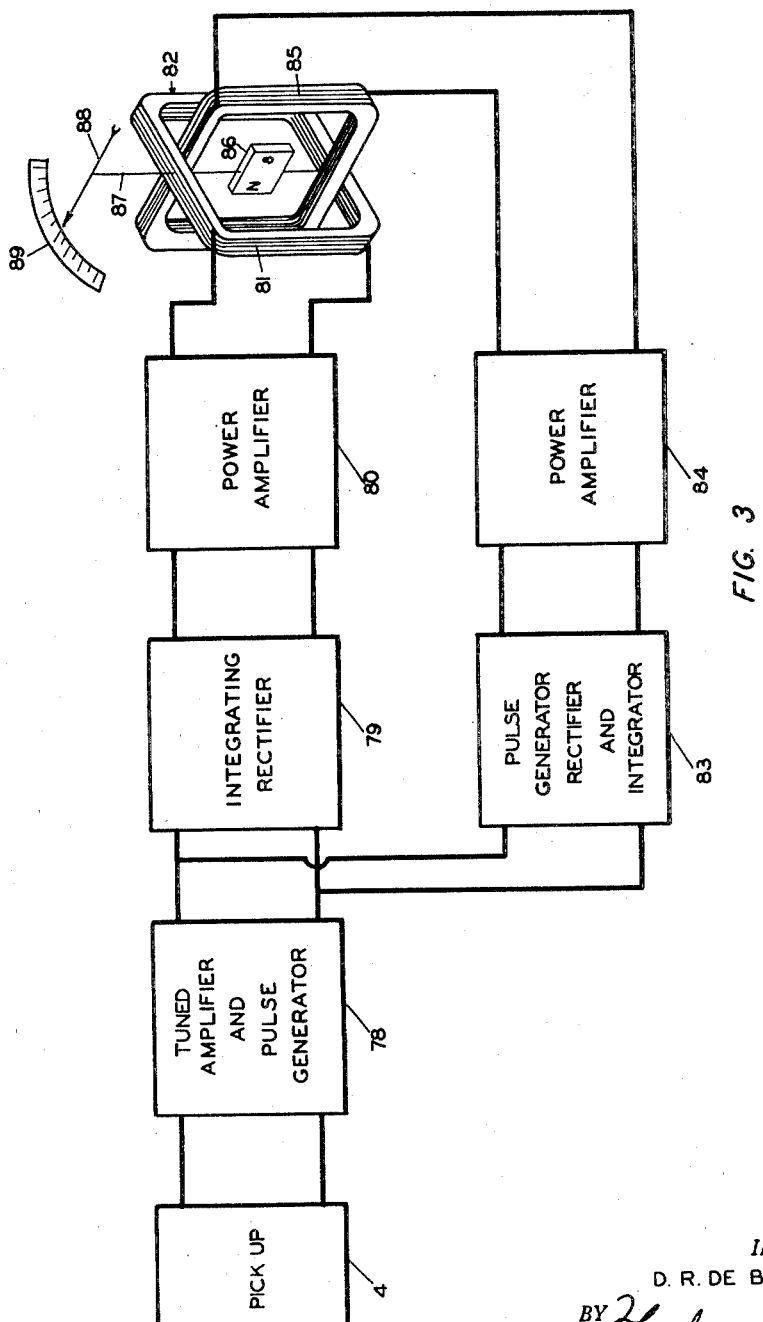
Figure 3 is a block diagram of a modified arrangement of electrical units also embodying the present invention.

Circuit of Figure 3

As pickup 4 is identical with that of Figure 1 the same number is used. The tuned amplifier and pulse generator 78 may be made identical to 5 of Figure 1, and could have been numbered 5 in Figure 3, but because of minor differences (such as the use of a tetrode instead of a triode as the second tube of the amplifier) a new number 78 is assigned. However the full equivalence of parts 5 and 78 should be understood.

The output of 78 is split into two channels. In the upper channel it is rectified and integrated in integrating rectifier 79. The full equivalence of 79 and 3 of Figure 1 should be understood, as they may be designed to be identical in spite of differences in Figures 2 and 4.

The output of 79 is amplified in power amplifier 80 and used to energize coil 81 of a ratio meter generally designated as 82. Ratio meter 82 may be any such type instrument but I prefer to use that made by T. A. Edison Company.

The other portion of the output of 78 takes the lower channel to 83. As explained in relation to Figs. 1 and 2 this output consists of exponential pulses with amplitudes proportional to the voltage generated by said knock components. Pulse generator rectifier and integrator 83 generates a uniform pulse for each pulse received from 78 and rectifies and integrates these uniform pulses in the same manner as parts 7 and 8 of Figure 1. The full equivalents of part 83 with parts 7 and 8 should be understood as identical circuits could be devised for them without departing from the invention.

The output of 83 is amplified in power amplifier 84 and used to energize coil 85 of ratio meter 82.

Coils 81 and 85 are placed at any angle to each other that the instrument maker desires, such as 60° or 90°. A permanent magnet 86 made of suitable material having north and south poles N and S is mounted rigidly on shaft 87 and pointer 88 is similarly mounted. As the current in coils 81 and 85 varies, magnet 86 is swung to a corresponding position and pointer 88 indicates the average intensity of detonation, or knocking, on suitable calibrated scale 89 independent of the time intervals between the detonating cycles of the engine (not shown). In other words, 88 indicates the average amplitude of a series of suitable amplitude and wave length voltage pulses from 4 regardless of their original source on a suitable calibrated scale 89.

Figure 4:
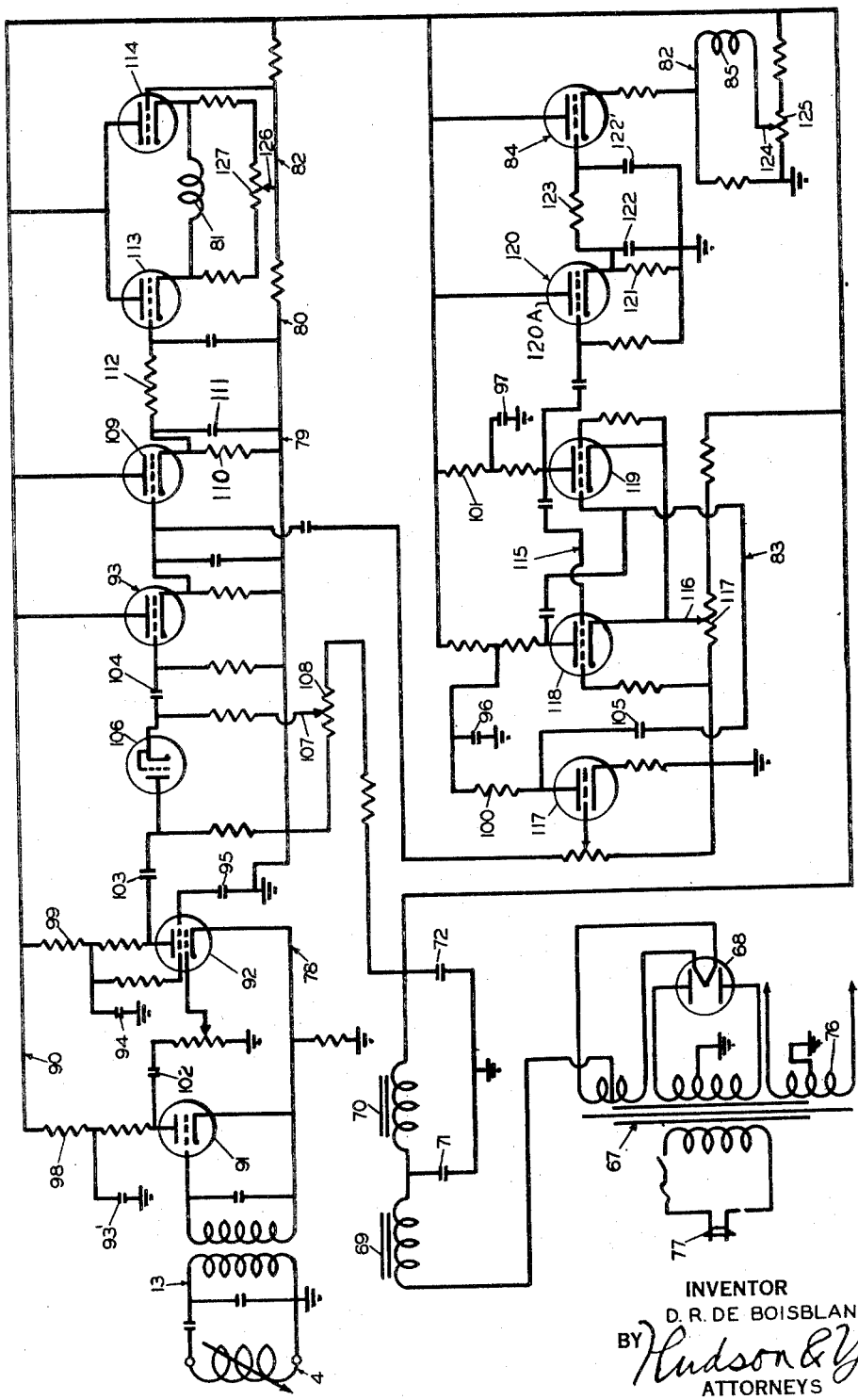
Figure 4 is a wiring diagram of a suitable electrical network which may be employed in setting up the apparatus shown in Figure 3.

Circuit of Figure 4

Figure 4 contains elements that correspond in function to the blocks 4, 78, 79, 80, 82, 83 and 84 of Figure 3, and they will be pointed out. However the blocks may contain more or less of the elements without invention.

Pickup 4

The pickup 4 may be any of those described with relation to Figure 1 and is represented symbolically by a variable inductance.

When the external type pickup is used in Figure 1 or in Figure 4 I may use a Lane Wells Co. (Los Angeles, California) external pickup which screws into a hole in, but not piercing, the combustion chamber of the internal combustion engine (not shown). In this case only the high frequency components are present in any degree, and the power stroke pressure components are substantially absorbed.

Tuned amplifier and pulse generator 78

Unit 78 comprises the same type filter 13 described above in relation to Figure 1, a standard type voltage amplifier generally designated as 90 comprising triode 91, tetrode 92 and related circuit elements, and a pulse generator generally designated as 93.

Condensers 93', 94, 95, 96, and 97 and resistances 98, 99, 100 and 101 are decoupling elements. Condensers 102, 103, 104 and 105 are coupling elements. Of course this does not comprise all the elements having such functions however.

The standard voltage amplifier 90 may be any known type. A threshold for determining the minimum voltage to be passed on and further amplified is provided by diode connected triode 106, the threshold value being set by adjustable tap 107 on resistance 108.

Integrating rectifier 79

Triode 109 with resistance 110 to provide an electrical leak, condenser 111, and a large resistance 112 (such as 20 megohms) comprises the integrating portion of 79. The very low resistance in the plate circuit of triode 109 causes it to act as a power rectifier.

Power amplifier 80

Any usual power amplifier may be employed, and I have shown one employing triodes 113 and 114 and related circuits, the power output being applied to coil 81 of ratio meter 82.

Pulse generator, rectifier and integrator 83

Pulse generator rectifier and integrator 83 is very similar to parts 7 and 8 of Figure 1.

The pulse generation portion 115 is almost identical with part 7 of Figure 2, the only difference being that the multivibrator bias 116 has been made adjustable to adjust for minor differences in voltage of the power supply. With normal power supply no adjustment is necessary and 117 could be a fixed resistance as in Figure 2. Triodes 117, 118 and 119 correspond respectively to triodes 59, 55 and 56 of Figure 2 and have the same functions.

The output of multivibrator 115 is fed to the rectifying and integrating circuit generally designated as 120. A triode 120A acts as a power rectifier similar to tube 109 for similar reasons.

The integrating circuit comprises a leak resistance 121, a condenser 122, and a large resistance 123, for example 10 megohms, and a condenser 122'.

Power amplifier 84

Any suitable power amplifier may be used as unit 84, the voltages received from 120 being amplified and used to energize coil 85 of ratio meter 82.

Ratio meter 82

Ratio meter 82 has already been described rather fully. The zero value of coil 85 is adjusted by tap 124 on resistance 125, and of coil 81 by tap 126 on resistance 127.

The power supply 67 is similar to that shown in Figure 2.

Operation of Figures 3 and 4

Pickup 4 generates a voltage proportional to the knocking intensity but containing relatively high amplitude and high frequency knock components, relatively high amplitude but low frequency power stroke pressure components, and relatively low amplitude high frequency valve clatter components. The power stroke components are filtered out and the valve clatter components cannot pass the threshold 106, 107, but the knock components are amplified and pulses are generated of amplitude proportional to the voltages generated by said knock components.

These pulses are sent along two channels to two opposed coils 81 and 85 of ratio meter 82.

The pulses going to coil 81 from amplifier 78 are rectified, integrated and amplified and run through coil 81. Those going to coil 85 from amplifier 78 are made uniform, by the process of generating a uniform pulse in 83 for each pulse reaching 83 from 78, and these uniform pulses are then rectified, integrated and amplified and run through coil 85.

Now for any ratio between the current in 81 and that in 85 there is a unique angular direction for the resultant magnetic field which acts to turn magnetic vane 86 with its N and S pole to a unique angular position. The scale 89 can therefore be calibrated, and while the divisions are not equidistant they are nearly so which allows easy reading. The laws by which the fields created by coils 81 and 85 combine and by which the vane 86 is moved, have already been calculated or discovered empirically by the makers, the T. A. Edison Company, and they furnish them already calibrated to indicate various ratios of current in one coil to that in the other coil.

Coil 81 has a current $I_1$ which current is substantially proportional to the sum of the values of the pulses from 78 over a certain period of time. Coil 85 has a current $I_2$ substantially proportional to the sum of the number of said pulses from 78 over a similar period of time. The ratio between these two currents is therefore substantially proportional to the average amplitude of said pulses from 78 independent of their number per time interval.

The operation of Figures 1 to 4, inclusive, is broadly the same, as generically speaking the voltage pulses to be measured are transmitted in a plurality of channels, the pulses in a first channel are integrated forming an integral which is a function of the product of the average amplitude and average frequency of occurrence of said pulses, a voltage is created in a second channel proportional to the average frequency of occurrence of said pulses, and said voltage is used to remove the effect of variations in the average frequency of occurrence of said pulses from said integral and the result is indicated. This result is substantially proportional to the average amplitude of a sequence of said voltage pulses with respect to the peak amplitudes of said pulses and independent of the time interval between said pulses.

It will be obvious therefore that I have devised a method and means in all of Figures 1 to 4 inclusive that is capable of carrying out all the objects of the invention in a suitable manner.

While in order to illustrate this invention certain preferred electrical circuits have been shown, it is believed obvious that numerous equivalent or alternative circuits and different elements of equivalent nature may be employed to obtain the same results without departing from the invention, and that the order of steps in the method may be varied or substitution of equivalent steps may be made without departing from the invention, the scope of which invention is defined only by the following claims.

Having described my invention, I claim:

1. The method of indicating the average amplitude of a sequence of voltage pulses comprising the steps of transmitting the pulses in a plurality of channels, integrating the pulses in a first channel which resulting integral is a function of the product of the average amplitude and average frequency of occurrence of said pulses, creating a voltage in a second channel proportional to the average frequency of occurrence of, but independent of the amplitude of, said pulses, applying said integral to move the indicator of an indicating device, and applying said voltage from said second channel to control said indicating device to vary the sensitivity thereof inversely as a function of the frequency of said pulses, whereby the average amplitude of said pulses is indicated.

2. The method of indicating the average amplitude of a sequence of voltage pulses comprising the steps of transmitting the pulses in a plurality of channels, amplifying and integrating the pulses in a first channel, which resulting integral is a function of the product of the average amplitude and average frequency of occurrence of said pulses, creating a voltage in a second channel proportional to the average frequency of occurrence of, but independent of the amplitude of, said pulses, using said created voltage to vary the amount of said amplification so as to remove the effect of variations in the average frequency of occurrence of said pulses from said integral, and indicating the result.

3. A detonation meter comprising in combination a pickup, a tuned amplifier and a first pulse generator connected to said pickup, a plurality of channels connected to said first pulse generator, a first one of said channels including a variable gain amplifier, a second one of said channels including a second pulse generator, a rectifier and integrator fed by said second pulse generator and connected to said variable gain amplifier so as to vary the gain thereof, a second rectifier and integrator fed by said variable gain amplifier, and a vacuum tube voltmeter fed by said second rectifier and integrator.

4. The method of indicating the average amplitude of a sequence of voltage pulses comprising the steps of transmitting the pulses in a plurality of channels, amplifying and integrating the pulses in a first channel, which resulting integral is a function of the product of the average amplitude and average frequency of occurrence of said pulses, creating a voltage in a second channel proportional to the average frequency of occurrence of, but independent of the amplitude of, said pulses, reducing the amplitude of the integrated pulses by an amount proportional to the magnitude of said second channel voltage, and measuring the resultant integrated pulses of reduced amplitude.

5. A detonation meter comprising, in combination, a pickup for converting pressure variations in a cylinder of an internal combustion engine into electrical voltages representative thereof, a tuned amplifier fed by said pickup, a pulse generator fed by said amplifier, a first channel including an integrating rectifier fed by said pulse generator and a power amplifier fed by said integrating rectifier, a second channel fed by said first pulse generator, said channel including a second pulse generator, a second integrating rectifier fed by said second pulse generator, and a power amplifier fed by said last mentioned integrating rectifier, a ratio meter having two coils, means connecting one of said coils to said first power amplifier, and means connecting the other of said coils to said second power amplifier.

6. Means for measuring the average amplitude of a sequence of voltage pulses comprising, in combination, a first pulse generator, a first channel including a variable gain amplifier fed by said pulse generator, a second channel fed by said first pulse generator, said second channel including a second pulse generator, an integrating rectifier fed by said second pulse generator, means connecting the output of said integrating rectifier to said amplifier so as to vary the gain thereof, a second integrating rectifier fed by said amplifier, and a vacuum tube voltmeter fed by the last mentioned integrating rectifier.

7. Means for measuring the average amplitude of a sequence of voltage pulses comprising, in combination, a first pulse generator, a first channel including an integrating rectifier fed by said first pulse generator and a power amplifier fed by said rectifier, a second channel fed by said first pulse generator, said second channel including a second pulse generator, a second integrating rectifier fed by said second pulse generator, and a power amplifier fed by said last mentioned integrating rectifier, a ratio meter having two coils, means for connecting the output of said first power amplifier to one of said coils, and means connecting the output of the second power amplifier to the other of said coils.

8. Means for measuring the average amplitude of a sequence of voltage pulses comprising, in combination, a first pulse generator, a first channel including an integrating rectifier fed by said pulse generator, a second channel fed by said first pulse generator, said channel including a second pulse generator, a second integrating rectifier fed by said second pulse generator, a ratio meter having two coils, means connecting the output of the first channel to one of said coils, and means connecting the output of the second channel to the other of said coils.

9. Means for measuring the average amplitude of a sequence of voltage pulses comprising, in combination, a first channel including a variable gain amplifier connected to a source of a sequence of voltage pulses, a second channel connected to said source, said second channel including a pulse generator, a rectifier and integrator unit fed by said pulse generator, and means for feeding the output of said unit to said amplifier so as to vary the gain thereof, a second rectifier and integrator unit fed by said amplifier, and a vacuum tube voltmeter fed by said last mentioned unit.

10. Means for measuring the average amplitude of a sequence of voltage pulses comprising, in combination, a channel including a pulse generator connected to a source of a sequence of voltage pulses, an integrating rectifier fed by said pulse generator, and a power amplifier fed by said rectifier, a second channel including second integrating rectifier connected to said source and a power amplifier fed by said second integrating rectifier, a ratio meter having two coils, means for feeding the output of the first channel amplifier to one of said coils, and means for feeding the output of the second channel amplifier to the other of said coils.

11. Means for measuring the average amplitude of a sequence of voltage pulses comprising, in combination, a first channel including a pulse generator connected to a source of a sequence of voltage pulses and an integrating rectifier fed by said pulse generator, a second channel connected to said source, said second channel including a second integrating rectifier, a ratio meter having two coils, and means for connecting said coils to the respective outputs of said integrating rectifiers.

12. A detonation meter comprising, in combination, a pickup for converting pressure variations in a cylinder of an internal combustion engine into electrical voltages representative thereof, a tuned amplifier fed by said pickup for eliminating voltage components of unwanted frequencies, a variable amplitude pulse generator fed by said amplifier, a first channel including a uniform pulse generator fed by said first pulse generator, and an integrating rectifier fed by said uniform pulse generator, a second channel including an integrating rectifier fed by said variable amplitude pulse generator, means controlled by the output of the first channel integrating rectifier for reducing the amplitude of the pulses in the second channel by an amount proportional to the magnitude of the first channel output voltage, and means for measuring the resultant integrated pulses of reduced amplitude.

13. Means for measuring the average amplitude of a sequence of voltage pulses comprising, in combination, a variable amplitude pulse generator, a first channel including an integrating circuit fed by said pulse generator, and indicating means fed by said integrating circuit, a second channel fed by said variable amplitude pulse generator said second channel including a uniform pulse generator, a second integrating circuit fed by said uniform pulse generator, and means controlled by the output of said second integrating circuit for reducing the amplitude of the integrated pulses in the first channel by an amount proportional to the magnitude of said second channel output voltage.

14. Means for measuring the average amplitude of a sequence of voltage pulses comprising, in combination, a first channel including an integrating circuit connected to a source of a sequence of voltage pulses, indicating means fed by circuit, a second channel fed by said source, said second channel including a uniform pulse generator, a second integrating circuit fed by said uniform pulse generator, and means controlled by the output of said second integrating circuit to reduce the amplitude of the pulses in the first channel by an amount proportional to the magnitude of said second channel output voltage.

15. A detonation meter comprising, in combination, a pickup for converting pressure variations in a cylinder of an internal combustion engine into electrical voltages representative thereof, a tuned amplifier fed by said pickup, a pulse generator fed by said amplifier, a first channel and a second channel fed by said pulse generator, said first channel including an integrating circuit, and indicating means fed by said circuit, said second channel comprising a uniform pulse generator, a second integrating circuit fed by said uniform pulse generator, and means controlled by the output of said second integrating circuit to reduce the amplitude of the first channel voltage by an amount proportional to the magnitude of the second channel output voltage.

DESLONDE R. DE BOISBLANC.

REFERENCES CITED

The following references are of record in the file of this patent:

UNITED STATES PATENTS

| Number | Name | Date |
|---|---|---|
| 1,602,882 | Chubb | Oct. 12, 1926 |
| 1,727,388 | Affel | Sept. 10, 1929 |
| 1,755,244 | Dietze | Apr. 22, 1930 |
| 1,902,496 | Fitzgerald | Mar. 21, 1933 |
| 2,038,873 | Purington | Apr. 28, 1936 |
| 2,163,404 | Mead | June 20, 1939 |
| 2,203,750 | Sherman | June 11, 1940 |
| 2,213,099 | Adorjan | Aug. 27, 1940 |
| 2,337,522 | Eldredge | Dec. 21, 1943 |
| 2,340,714 | Traver et al. | Feb. 1, 1944 |
| 2,374,248 | Tuttle | Apr. 24, 1945 |

FOREIGN PATENTS

| Number | Country | Date |
|---|---|---|
| 504,509 | Great Britain | Apr. 26, 1939 |
| 552,098 | Great Britain | Mar. 23, 1943 |
| 553,523 | Great Britain | May 25, 1943 |

Certificate of Correction

Patent No. 2,534,004

December 12, 1950

DESLONDE R. de BOISBLANC

It is hereby certified that error appears in the printed specification of the above numbered patent requiring correction as follows:

Column 5, line 50, for the word "bolt" read *volt*; column 12, line 24, before "circuit" insert *said*;

and that the said Letters Patent should be read as corrected above, so that the same may conform to the record of the case in the Patent Office.

Signed and sealed this 6th day of March, A. D. 1951.

[SEAL]

THOMAS F. MURPHY,
*Assistant Commissioner of Patents.*